Patented Dec. 27, 1949

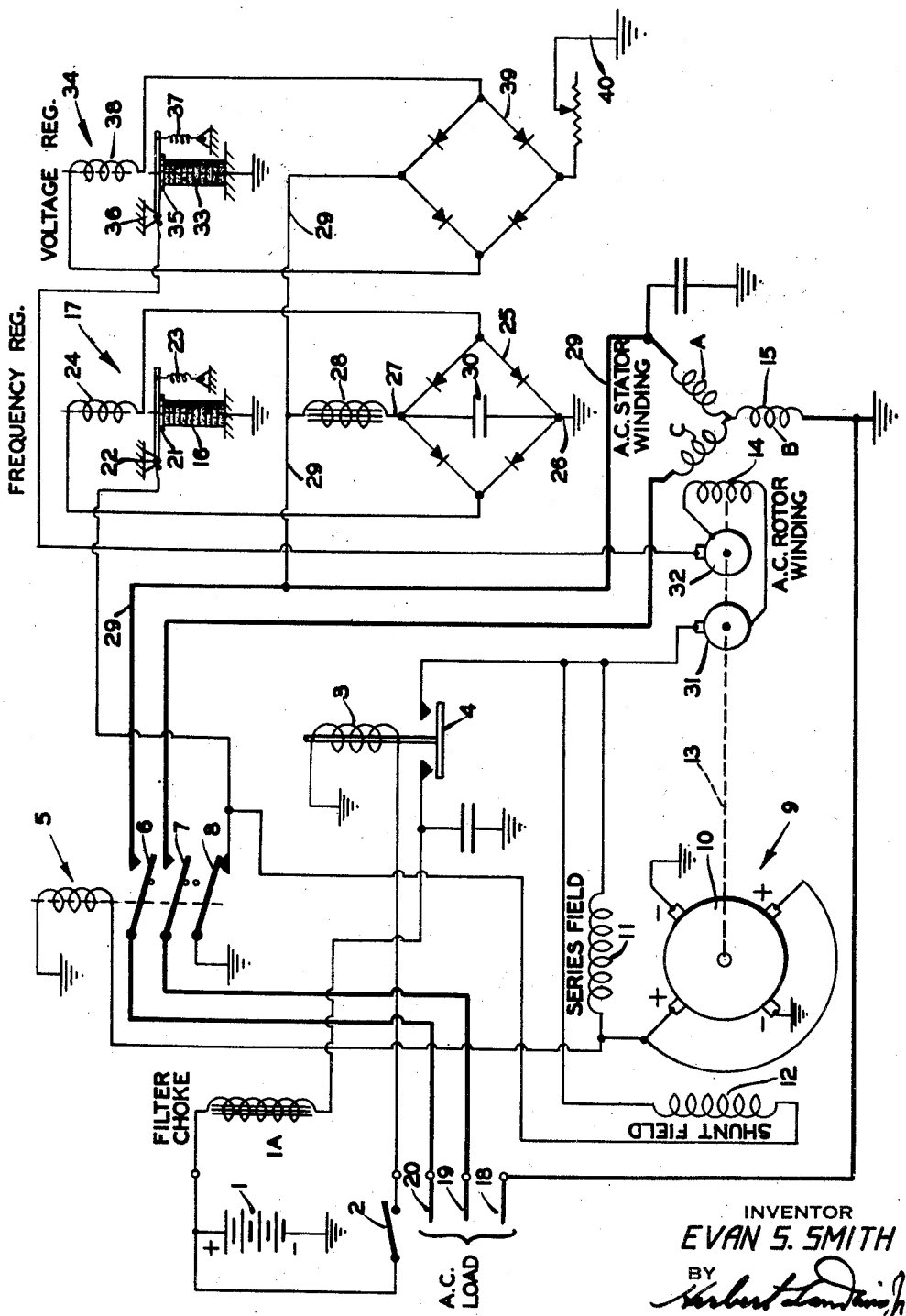

2,492,540

UNITED STATES PATENT OFFICE 2,492,540

SYSTEM FOR REGULATING FREQUENCY AND VOLTAGE OF MOTOR ALTERNATORS

Evan Stine Smith, Hasbrouck Heights, N. J., assignor to Bendix Aviation Corporation, Teterboro, N. J., a corporation of Delaware Application January 30, 1947, Serial No. 725,252

6 Claims. (Cl. 322—39)

The present invention relates to electrical regulating systems and more particularly to a voltage and frequency regulating system for a motor alternator.

An object of the invention is to provide a novel transfer relay which acts as a line switch and also to cut in the frequency regulator during starting when the generated voltage rises to nearly the operating value and to a frequency in excess of the resonant peak of a frequency regulating circuit (the resonant frequency of which is much less than the normal operating frequency range).

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claims for this purpose.

The drawing is a diagrammatic showing of a system embodying the invention.

In the arrangement shown in the drawing, there is provided a source of direct current 1 which is connected through a switch 2 to an electromagnetic winding 3 which controls a starting switch 4 normally open. The switch 4 is biased to a closed position upon energization of the winding 3 so as to close a main D. C. input circuit, including a filter choke 1A of conventional type for preventing radio interference.

There is further provided a transfer relay winding 5, which controls line switches 6 and 7 and a third switch 8. Upon de-energization of relay 5, switches 6 and 7 are biased to an open position, while switch 8 is held closed.

When switch 2 is open, starting relay coil 3 is de-energized with the result that switch 4 opens and thereby disconnects the D. C. source of electrical energy 1 from a D. C. motor indicated generally by the numeral 9 and having an armature winding 10, series winding 11 and shunt field winding 12 of conventional type.

The motor 9 drives through a shaft 13, an exciting winding 14 of an alternator having three phase stator windings 15 including windings A, B, and C.

The transfer relay winding 5 is energized through a non-emissive conductive path which continuously connects winding 5 across the armature winding 10 of the motor 9. By the term "non-emissive conductive path" is meant a path which current may traverse by the ordinary phenomenon of conduction as distinguished from conduction through an electric valve, which includes electronic emission from an electrode to a gaseous space or vacuum. Thus, the closing of the starting switch 4 by energizing the winding 3 connects the D. C. source 1 to the armature winding 10 and the series field winding 11 of the motor 9. Due to the starting inrush of current through series field winding 11, the voltage across the armature 10 is too low to cause transfer relay winding 5 to actuate relay switches 6, 7 and 8 until the armature 10 is nearly up to speed.

Until the operating speed of the motor 9 is nearly reached, it is desirable to keep the full current in the shunt field winding 12 of the motor 9. Hence, the switch 8 of the transfer relay is arranged so as to shunt out of operation a variable resistance or carbon pile element 16 of a frequency regulator 17. Upon the opening of switch 8 the variable resistance 16 is connected in series with the shunt field 12 of the motor 9 and the source of electrical energy 1.

When the speed of the motor has increased to near operating speed, the transfer relay switch 8 is opened by action of relay winding 5 which is energized by the rise in voltage across the armature 10 upon the increase in motor speed. The transfer relay winding 5 also connects a suitable A. C. load, not shown, at lines 18, 19 and 20 to the alternator stator winding 15 upon the motor speed reaching near operating speed.

The carbon pile regulator 17 may be of a type disclosed and claimed in the U. S. patent application Serial No. 570,002 filed December 27, 1944, by William G. Neild, and now U. S. Patent No. 2,427,805 granted September 23, 1947, and assigned to Bendix Aviation Corporation.

The frequency regulator is shown diagrammatically as including an armature 21, pivoted at 22 and biased under tension of spring 23 in a direction tending to decrease the resistance of the pile 16 and thereby increasing the energization of the shunt field 12 so as to effect a decrease in the speed of the motor 9.

An electromagnetic winding 24 biases the armature 21 in a direction opposing the spring 23 and tending to increase the resistance of the carbon pile 16 so as to decrease the energization of the shunt field 12 and thereby increase the speed of the motor 9.

The control winding 24 is connected across the output of a rectifier 25. The rectifier 25 has A. C. input connections 26 and 27. The input connection 26 is ground connected to the grounded winding B of the alternator winding 15. The opposite input connection 27 of the rectifier 25 is connected through an iron core reactance 28 and a conductor 29 to the winding A of the alternator winding 15.

Connected across the A. C. input connections 26 and 27 of the rectifier 25 is a capacitor 30. This provides a circuit so arranged as to have a resonant frequency somewhat less than the normal operating speed range of the motor 9. Thus when the frequency regulator 17 has been cut into operation by the action of transfer relay 5 and the opening of relay switch 8, the output frequency of the alternator 15 driven by the motor 9 is somewhat greater than the resonant frequency of the A. C. input circuit of the rectifier 25.

Thus, at a constant output voltage of the alternator 15, the current energizing the winding 24 tends to decrease upon an increase in the regulated frequency and to increase upon a decrease in the regulated frequency. This action tends to regulate through the carbon pile 16 the speed of the motor 9 so as to maintain the output frequency of the alternator substantially constant.

The exciting winding 14 is connected to slip rings 31 and 32. The ring 31 is connected by a suitable conductor to one contact of the starting switch 4, while the ring 32 is connected by a suitable conductor to one end of a variable resistance or carbon pile element 33 of a voltage regulator 34. The opposite end of the carbon pile element 33 is grounded so that upon the closing of the starting switch 4 the source of electrical energy 1 is connected through the variable resistance 33 to the exciting winding 14 of the alternator.

The carbon pile regulator 34 may be of a type disclosed and claimed in the U. S. patent application Ser. No. 570,002 filed Dec. 27, 1944, by William G. Neild, and now U. S. Patent No. 2,427,805 granted September 23, 1947, and assigned to Bendix Aviation Corporation.

The voltage regulator is shown diagrammatically as including an armature 35, pivoted at 36 and biased under tension of spring 37 in a direction tending to decrease the resistance of the pile 33 and thereby increasing the energization of the exciting winding 14 so as to effect an increase in the voltage output of the alternator.

An electromagnetic winding 38 biases the armature 35 in a direction opposing the spring 37 and tending to increase the resistance of the carbon pile 33 so as to decrease the energization of the exciting winding 14 and thereby decrease the output voltage of the alternator.

The control coil 38 is connected to the output of a rectifier 39 having an A. C. input connected through conductor 29 and a grounded connection 40 across the windings A and B of the alternator stator winding 15. Thus the regulator 34 tends to regulate the output voltage of the alternator.

From the foregoing, it will be seen that upon a decrease in the load across the lines 18, 19 and 20, the output voltage of the alternator tends to rise, which tendency is but partially overcome by the voltage regulator 34 and the motor 9 tends to speed up. When the motor 9 tends to speed up, the current in the frequency regulator coil 24 tends to decrease so as to effect a decrease in the motor speed.

It may be noted that the current in the frequency regulator coil 24 decreases upon an increase in output frequency of the alternator over the working range of the regulator 17, while an opposite action is effected upon a decrease in the output frequency of the alternator. Thus, in the arrangement shown, the transfer relay 5 is needed for closing the switch 8 at motor speeds below the resonant peak of the A. C. input circuit of the frequency regulator 17 (less than the operating frequency range) since the regulation would then be in the wrong direction, but upon opening the switch 8 there is a continuous decrease in the current in the coil 24 with an increase in frequency. The transfer relay 5 through operation of switches 6, 7 and 8 also effects a quick and desired starting characteristic of the motor 9 by disconnecting the A. C. load and shunting the frequency regulator 17 out of operation until the speed of the motor 9 approaches near the desired operating speed.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In a system of the character described, the combination comprising an alternating current generator, an electric motor for driving said generator, a shunt field winding for controlling the speed of said motor, a variable resistance element for regulating the energization of said shunt field winding, a rectifier having an alternating current input and a direct current output, an electromagnetic winding connected across said direct current output for operating said variable resistance element, a circuit including an iron core reactance winding and a capacitor, connecting said alternating current input across the output of said generator, said capacitor being connected across the alternating current input to said rectifier to tune said circuit to a predetermined resonant frequency, and a relay for shunting said variable resistance element when said generator is driven by said motor at a speed at which the output frequency of the current from said generator is less than a predetermined minimum frequency greater than said resonant frequency, said relay being so arranged as to permit operation of said variable resistance element when said motor reaches a speed at which the output frequency of the current from said generator is greater than said minimum frequency.

2. In a system of the character described, the combination comprising an alternating current generator, an electric motor for driving said generator, a shunt field winding for controlling the speed of said motor, a variable resistance element for regulating the energization of said shunt field winding, a rectifier having an alternating current input and a direct current output, an electromagnetic winding connected across said direct current output for operating said variable resistance element, a circuit including an iron core reactance winding and a capacitor, connecting said alternating current input across the output of said generator, said capacitor being connected across the alternating current input to said rectifier to tune said circuit to a predetermined resonant frequency, a relay mechanism including an electromagnetic winding connected across a direct current input of said motor, and a plurality of relay switch members operated by said last mentioned electromagnetic winding for controlling the connection of the generator output to a main load and the operation of said variable resistance element, said last mentioned electromagnetic winding operating one of said switch members to shunt said variable resistance element when said generator is driven by said motor at a speed at which the output frequency of the current from said generator is less than a predetermined minimum frequency greater than said resonant frequency, said one switch member being operated by said last mentioned electromagnetic winding to open said shunt circuit when the motor reaches a speed at which the output frequency of the current from said generator is greater than said minimum frequency.

3. In a system of the character described, the combination comprising an alternating current generator, an electric motor for driving said generator, a shunt field winding for controlling the speed of said motor, a variable resistance element for regulating the energization of said shunt field winding, a rectifier having an alternating current input and a direct current output, an electromagnetic winding connected across said direct current output for operating said variable resistance element, a tuned circuit having a predetermined resonant frequency connecting said alternating current input across the output of said generator, and relay means for closing a circuit shunting said variable resistance element out of operation when said generator is driven by said motor at a speed at which the output current from said generator has a frequency less than a predetermined minimum frequency greater than said resonant frequency, said relay means being so arranged as to open said shunting circuit and permit operation of said variable resistance element when said motor reaches a speed at which the output current from said generator has a frequency exceeding said minimum frequency.

4. The combination defined by claim 3 in which said relay means includes an electromagnetic control winding connected across a current input to said motor and responsive to motor input voltage for opening said shunting circuit to permit operation of the variable resistance element.

5. In a system of the character described, the combination comprising an alternating current generator, an electric motor for driving said generator, said motor having a winding to control the speed thereof, means for regulating the energization of said speed control winding, an electromagnetic winding for operating the regulating means, circuit means including a tuned circuit having a predetermined resonant frequency for connecting said electromagnetic winding across the output of said generator, and relay means to effect inoperation of said regulating means when said generator is driven by said motor at a speed at which the output current from said generator has a frequency less than a predetermined minimum frequency greater than said resonant frequency and to effect operation of said regulating means when said motor reaches a speed at which the output current from said generator has a frequency exceeding said minimum frequency.

6. In a system of the character described, the combination comprising an alternating current generator, an electric motor for driving said generator, said motor having a winding to control the speed thereof, means for regulating the energization of said speed control winding, an electromagnetic winding for operating the regulating means, circuit means including a tuned circuit having a predetermined resonant frequency for connecting said electromagnetic winding across the output of said generator, relay means responsive to motor input voltage to effect inoperation of said regulating means when said generator is driven by said motor at a speed at which the output current from said generator has a frequency less than a predetermined minimum frequency greater than said resonant frequency and to effect operation of said regulating means when said generator is driven by said motor at a speed at which the output current from said generator has a frequency in excess of said minimum frequency.

EVAN STINE SMITH.

REFERENCES CITED

The following references are of record in the file of this patent:

UNITED STATES PATENTS

| Number | Name | Date |
| --- | --- | --- |
| 2,366,167 | Adorjan et al. | Jan. 2, 1945 |